Figure 1:
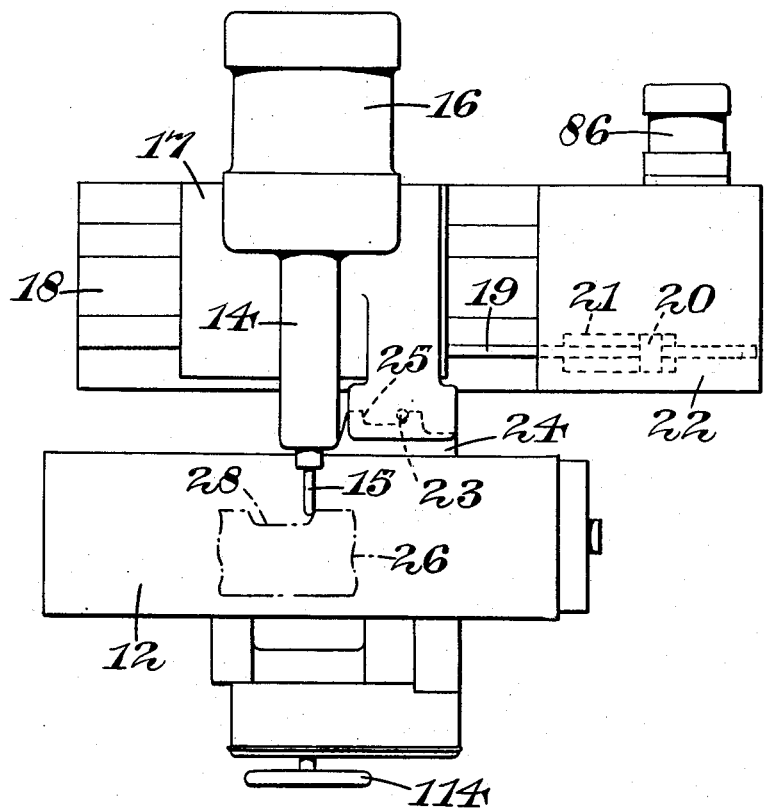

Dec. 26, 1939.    J. T. BOLAS    2,184,708
MILLING MACHINE
Filed March 24, 1939    3 Sheets-Sheet 1

Inventor
John T. Bolas
by Wilkinson & Mawhinney
Attorneys.

Dec. 26, 1939.  J. T. BOLAS  2,184,708
MILLING MACHINE
Filed March 24, 1939  3 Sheets-Sheet 2

Inventor
John T. Bolas
by Wilkinson & Mawhinney
Attorneys.

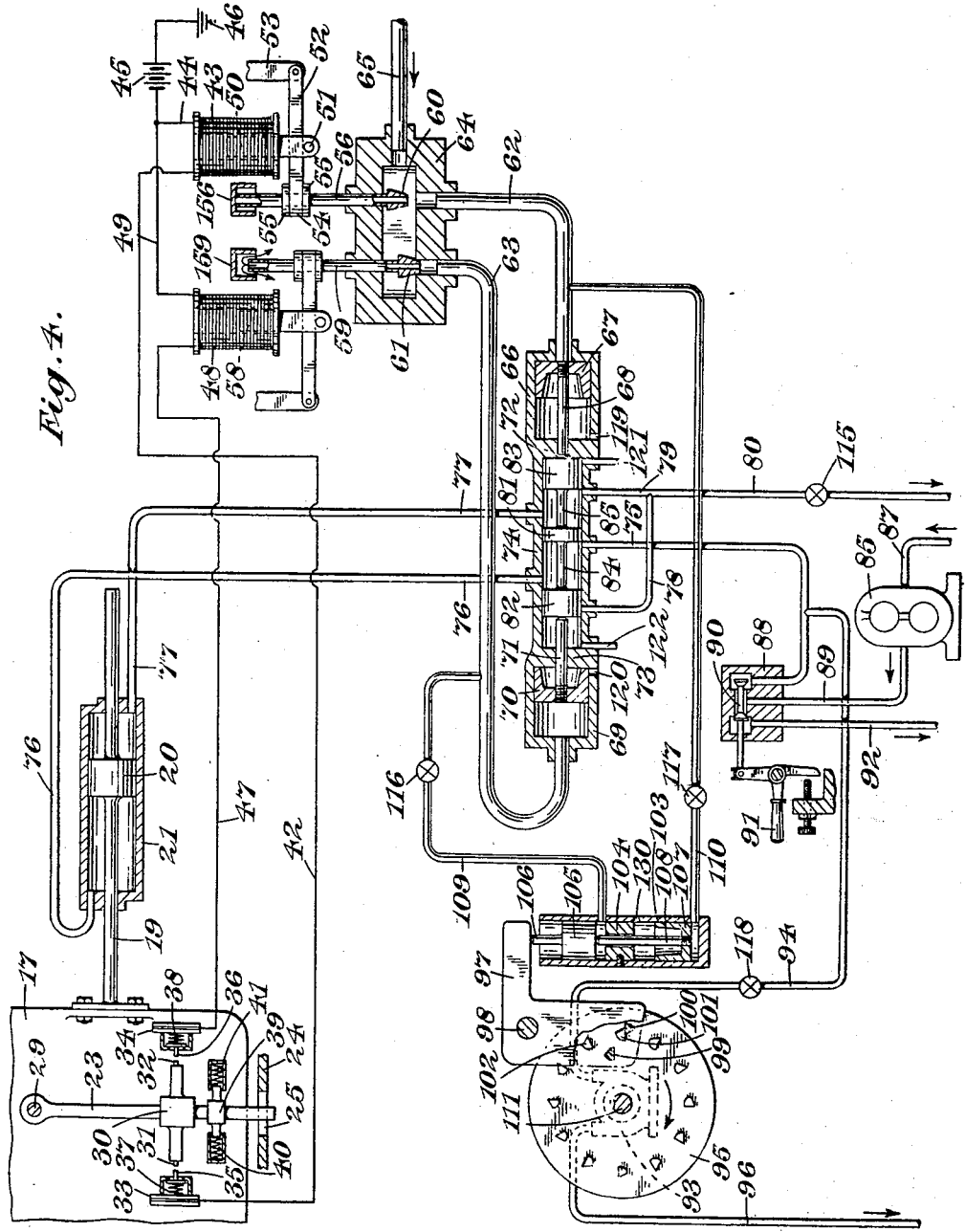

Patented Dec. 26, 1939

2,184,708

UNITED STATES PATENT OFFICE 2,184,708

MILLING MACHINE

John Thomas Bolas, Bristol, England, assignor to The Bristol Aeroplane Company Limited, Bristol, England, a British company Application March 24, 1939, Serial No. 263,977
In Great Britain May 28, 1938

1 Claim. (Cl. 90—13.5)

This invention relates to milling and like machines, for copying and reproducing, of the kind in which a feeler co-operates with a former or pattern to control the movement of the cutter with respect to the work. The object of the invention is to provide a machine of this kind in which the relative traversing movement between the cutter and the work is automatically and rapidly reversed at the end of each traversing movement of the feeler with respect to the pattern.

According to the invention, a machine of the kind described comprises a reciprocating hydraulic motor for traversing a feeler with respect to a pattern and a cutter with respect to the work, valve-mechanism associated with said motor for automatically reversing it, electrical means controlled by pressure between the feeler and the pattern and an interconnection between the electrical means and said valve. The said interconnection is preferably a quick-acting relay. For example, the said valve may be operated pneumatically, the pressure-gas being controlled by said electrical means.

A specific embodiment of the invention will now be described by way of example with reference to the accompanying drawings which illustrate a machine designed for the purpose of cutting the inter-fin spaces in the cylinder-heads or cylinder barrels of an air-cooled internal-combustion engine. In the drawings:—

Figure 2:
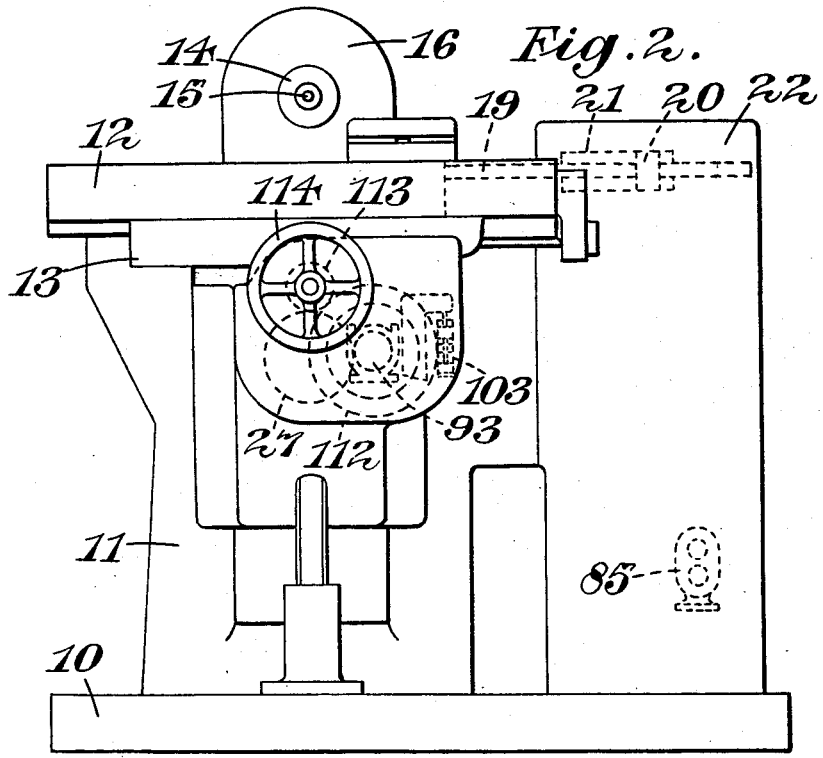
Figure 3:
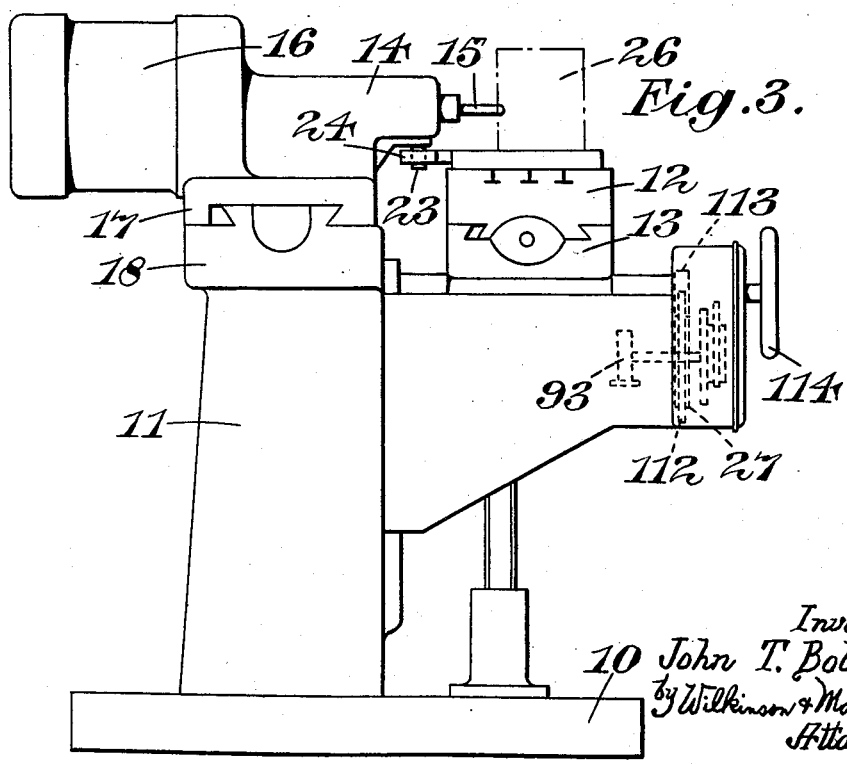

Figure 1 is a plan, Figure 2 a front elevation, and Figure 3 a side elevation of the complete machine showing its general arrangement, and Figure 4 is a diagram showing the electrical, pneumatic and hydraulic circuits.

As shown in Figures 1, 2 and 3, the machine comprises a bed-plate 10 and supporting frame 11 which carry a work-table 12 carried on an adjustable slide 13. The frame 11 also carries a cutter-head 14 comprising a milling cutter 15 driven by an electric motor 16. The cutter-head is carried on a table 17 which is slidable from left to right, as seen in Figures 1 and 2, on a slide 18. The table 17 is fixed to the end of a piston rod 19 of which the piston 20 reciprocates in a hydraulic cylinder 21 carried by a fixed part 22 of the machine frame. The table 17 also carries a downwardly-projecting pin 23 which constitutes a feeler and co-operates with a former or pattern comprising a plate 24 carried by the work-table 12.

The pattern 24 is cut with a notch 25 of which the profile is a prototype of the shape which is to be cut in the work 26.

In order that the functions of the various parts described with reference to Figure 4 may be clearly understood, the operation of the machine will first be described. The hydraulic motor 21 reciprocates the table 17 from left to right as shown in Figure 1. When the feeler 23 abuts against the edge of the slot 25 in the pattern 24 a series of automatic operations ensues whereby the direction of movement of the piston 20 is reversed and at the same time a gear 27 is rotated through a small angle; the gear 27 is carried on the end of a feed-screw (not shown) which advances the work-table through a short distance towards the milling cutter 15. At the end of the next traversing stroke of the feeler 23 with respect to the notch 25 the piston 20 is similarly reversed and the feed-screw similarly rotated, so that a slot 28 is cut in the work 26 to a shape corresponding to the shape of the notch 25 in the pattern 24.

In this specific embodiment the diameter of the cutter is equal to the vertical dimension of the slot to be cut in the work, so that only two relative movements need to be provided for; (1) a traversing movement of the cutter-head 14 from left to right, as seen in Figures 1 and 2, and (2) a depth-feed by which the work is fed towards the cutter whereby the cutter penetrates the work. However, where the invention is to be applied to the cutting of shapes of which no dimension is equal to the size of the cutter a third component of relative movement between the cutter and the work would need to be provided, either automatically or otherwise.

In the diagram of Figure 4 the feeler 23 is shown as a rod pivoted at 29 to the table 17 and projecting downwardly into the notch 25 in the pattern 24. The rod 23 carries between its ends a collar 30 carrying electric contacts 31, 32 which co-operate respectively with fixed contacts 33, 34, the contact portions 35, 36 being pressed towards a limiting innermost position by means of suitable springs 37, 38. The rod 23 also carries a collar 39 which is acted upon by two compression springs 40 and 41 which tend to maintain the rod 30 in a central position as shown. The rod 23 is assumed to be connected to earth so that only one conductor of each electric circuit need be described. The electric contact 33 is connected by a conductor 42 to a solenoid 43, the other end of the winding of which is connected by a conductor 44 to a battery 45, or other source of electric current, the other pole of which is earthed as shown at 46. The other electric contact 34 is connected by a conductor 47 to a similar solenoid 48, the other end of the winding of which is connected by a conductor 49 to the battery 46.

The solenoid 43 controls an armature 50 carrying a pin 51 at its lower end, the pin engaging a lever 52 which is pivoted at one end to an anchorage 53 and which is formed at its other end with a fork 54 lying between collars 55 on the tube or stem 56 of a pneumatic valve. The solenoid 48 similarly controls a yoke 58 which operates in a like manner upon the stem 59 of another pneumatic valve.

The stems 56 and 59 are formed respectively with conical valve members 60, 61 which control conduits 62, 63, communicating with a valve chest 64, to which compressed air is admitted through a pipe 65. The conduit 62 leads to the end of an air-cylinder 66 containing a piston 67 having a piston-rod 68. The conduit 63 similarly leads to an air-cylinder 69 in which a piston 70 is slidable. The piston-rods 68 and 71 are respectively guided in glands 72, 73, and abut against either end of a hydraulic valve which will now be described.

The cylinder 74 of the valve is supplied with oil under pressure through a pipe 75 in a manner described below. Two delivery pipes 76, 77 lead respectively to the left-hand and right-hand ends of the hydraulic cylinder 21, the piston 20 of which performs the traversing movement of the cutter. The cylinder is also formed with two drain ports which lead by pipes 78, 79, to a drain 80.

The valve member comprises a middle land 81 and end lands 82, 83, the three lands being separated by rod portions 84, 85, of reduced diameter. It will be seen that, when the valve is in the position shown, oil under pressure can flow from the pipe 75 around the portion 84, and through the pipe 76 to the left-hand end of the cylinder 21, and that oil discharged from the right-hand end of the piston 20 can flow by way of the pipe 77 around the rod 85 to the drain 80. When the valve is moved to the left the land 81 moves to the left of the pressure port, so that the pipe 75 supplies oil under pressure to the pipe 77 and oil is drained from the pipe 76 around the rod 84 into the pipe 78.

The oil pressure is generated by means of a pump 85 of the gear-wheel type which may be driven by an electric motor indicated at 86 in Figure 1. Oil is taken in from a suitable sump through a pipe 87 and delivered to the interior of a control-valve 88 through the pipe 89. The valve member 90, when in the position shown in Figure 4, permits the oil from the pipe 89 to pass into the pipe 75, but when a hand-lever 91 is rocked in a counterclockwise direction the valve 90 closes the admission to the pipe 75 and connects the pipe 89 to a drain 92 which leads back to the sump.

The depth-feed is effected by a hydraulic motor 93 of the rotary type which is supplied with oil under pressure through a branch 94 from the pipe 75 and which discharges oil through a pipe 96 leading back to the sump. The motor is controlled by an escapement of known type comprising a pallet-wheel 95 and a pallet 97 pivoted at 98. The pallet carries teeth 99, 100, and the wheel 95 carries teeth 101, 102, etc. The motor 93 tends to rotate in the direction of the arrow, but is normally restrained against movement by the abutment of the tooth 101 against the tooth 100. When the pallet 97 is rocked in a counterclockwise direction the tooth 100 moves out of engagement with the tooth 101 whereby the wheel 95 is temporarily released and the tooth 101 moves downwardly. However, the tooth 102 strikes against the inclined surface of the tooth 99, whereby the pallet is rocked back to its original position and the wheel 95 is brought to rest with the tooth 102 abutting against the tooth 100. Similarly, whenever the pallet 97 is rocked about its pivot the wheel 95 advances through one tooth.

The escapement is controlled by an air-relay 103 comprising an outer cylinder and a fixed partition 104. Above the partition is a piston member 105 having a rod 106 to engage the pallet 97 directly, and below the partition 104 is a piston 107 having a rod 108 which passes through the partition and abuts against the underside of the piston 105. The cylinder space above the partition is connected by a pipe 109 with the air-pipe 63, and the space below the piston 107 is connected by a pipe 110 with the air-pipe 62.

The operation of the apparatus diagrammatically shown in Figure 4 will now be described. Assuming that the piston 20 is being driven to the right by oil under pressure from the pipes 75, 76, the bottom of the feeler 23 will eventually abut against the right-hand edge of the notch 25. The movement of the feeler 23 will thereupon be arrested, although movement of the table 17 to the right will tend to continue. Consequently, the feeler 23 will rotate through a small angle about the pivot 29 whereby the electric contact 31 will engage the contact member 35 and the solenoid 43 will be energised. The armature 50 will raise the lever 52 whereby the valve member 60 will open the pipe 62 and air under pressure from the pipe 65 will be admitted to the right-hand end of the cylinder 66. Consequently, the piston 67 will move to the left and the rod 68 will slide the hydraulic valve 81, 82, 83, towards its extreme left-hand position. The consequent movement of the piston 70 to the left discharges air from the cylinder 69 along the pipe 63, through the interior of the valve-stem 59. Movement of the hydraulic valve to the left reverses the pressure and drain circuits in the manner already explained, so that oil under pressure is now admitted through the pipe 77 to the right-hand end of the cylinder 21, and the oil from the left-hand end of the cylinder 21 is drained away through the pipe 76. Consequently, the movement of the piston 20 is immediately reversed and the table 17 begins its traverse towards the left. Air is prevented from escaping from the chest 64 through the stem 59 by the closed end of the tube 159 which seals the interior of the stem. In Figure 4 the stem 56 is shown in the position in which it is closed by the tube 156 the top of which opens into a tube 159 of larger internal diameter than the stem so that the air can escape as shown by the arrows.

The opening of the valve member 60 also admits air from the pipe 65 to the pipe 110 whereby the piston 107 rises, causing the rod 108 to lift the piston 105, whereby the rod 106 actuates the escapement so as to cause the wheel 95 to rotate in the manner already described. The space between the piston 107 and the partition 104 is maintained at atmospheric pressure by a vent 130. The shaft 111 of the escapement wheel carries a gear 112 which drives a gear 113 engaging the gear 27 (see Figures 2 and 3), whereby the feed-screw is rotated through the necessary angle. On the same shaft as the gear 113 a suitable hand-wheel 114 is mounted for manually adjusting the feed.

At the end of the traverse of the table 17 towards the left, that is to say, when the feeler 23 strikes the left-hand end of the notch 25 in the pattern 24, the contact 32 closes the circuit 47 of the solenoid 48, whereby the valve 61 opens the air-pipe 63 and the piston 70 drives the hydraulic valve 81, 82, 83 towards the right into the position shown. Thus, the movement of the traversing piston 20 is again reversed and the machine continues automatically in this fashion until the slot 28 in the work has been cut to the required depth. When the valve 61 opens air is admitted through the pipe 109 to the space between the partition 104 and the piston 105, whereby the escapement is actuated and the depth-feed advanced. Thus, the depth-feed is advanced every time the table 17 reaches the end of its traversing movement.

The rate at which the table 17 is traversed may be controlled by adjusting a valve 115 in the drain 80. The instant in the cycle at which the depth-feed is operated may be adjusted by means of reducing valves 116, 117 in the air-pipes 63 and 62 respectively. The rate of rotation of the feed-screw may be adjusted by means of a valve 118 in the pipe 94 leading to the motor 93.

It will be understood that the air-valves 60 and 61 are both closed during the traverse of the table 17. The valve 60 is shown open for the purposes of illustration. Also, ports 119 and 120 are formed in the air-cylinders 66, 69, respectively to relieve air from the opposing faces of the pistons 67, 70. For a like reason drain conduits 121, 122 are provided at the ends of the valve cylinder 74.

Automatic mechanism (not shown) may also be provided whereby the machine is automatically stopped when the depth-feed has proceeded to a predetermined extent.

It will be seen that by the provision of an electric circuit controlled by the feeler, a very sensitive action of the feeler is possible. The valve 64, the cylinders 66, 69 and the pistons 67, 70 constitute a pneumatic relay controlled by the electric circuit so that the current supplied to the electric circuit may be kept low and yet sufficient power is obtainable for shifting the hydraulic piston-valve. A pneumatic relay has the advantage that it is quick-acting. A hydraulic motor for reciprocating the slide has the advantage that it is steady and powerful.

It will be understood that the relative movements above described may be effected by movement of either of the relatively movable parts. For example, the cutter-head and feeler might be held stationary and the traversing movement effected by reciprocation of the work and the pattern-plate.

I claim:

A milling machine comprising a cutter to co-operate with the work and a feeler to co-operate with a pattern, a reciprocating hydraulic motor for traversing the feeler with respect to the pattern and the cutter with respect to the work, valve mechanism associated with said motor for automatically reversing it, electrical control-means actuated by pressure between the feeler and pattern, an interconnection between said electrical control-means and the said valve, a rotary hydraulic motor to drive an intermittent depth-feed, an escapement normally operative to lock the motor against rotation and a pneumatic relay actuated by said electrical means to release the escapement whenever the feeler abuts against the pattern.

JOHN THOMAS BOLAS.